Patented Mar. 21, 1939

2,151,382

UNITED STATES PATENT OFFICE 2,151,382

DIOLEFIN POLYMERIZATION PROCESS

Jesse Harmon, Wilmington, Del., assignor to E. I. du Pont de Nemours & Company, Wilmington, Del., a corporation of Delaware No Drawing. Application July 13, 1937, Serial No. 153,433

5 Claims. (Cl. 260—86)

This invention relates to the polymerization of unsaturated aliphatic hydrocarbons and more particularly to the use of catalysts therein.

This invention has as an object the provision of a new process for the manufacture of hydrocarbon polymers from mixtures of olefins and diolefins. A further object is the provision of a novel catalyst for this process. A still further object is the preparation of new hydrocarbon polymers useful as lubricating oils and as drying oils and resin substitutes. Other objects will appear hereinafter.

These objects are accomplished by the following invention wherein a diolefin, or halogen substitution product thereof, is polymerized by bringing the same alone or in admixture with a mono-olefin or a different diolefin in contact at 0–50° C. with hydrated boron fluoride having from one to two mols of water per mol of $BF_3$. A preferred form of the invention is that wherein a mixture of a mono-olefin and a diolefin is polymerized.

In the preferred practice of the invention, mixtures of mono-olefins and diolefins are polymerized by treatment at 25–35° C. with aqueous boron fluoride ranging in composition between the monohydrate and the dihydrate. Either gaseous or liquid olefinic hydrocarbons may be used. The product is essentially immiscible with the catalyst and is separated as an oily layer and freed from traces of catalyst by treatment with water or dilute alkali.

The more detailed practice of the invention is illustrated by the following examples, wherein parts given are by weight unless otherwise stated. There are of course many forms of the invention other than these specific embodiments. In the examples the expression $BF_3(H_2O)_x$ indicates a solution, compound, or mixture of products obtained by mixing, one mol (67.8 parts) of boron fluoride $BF_3$ in X mols (18 X parts) of water.

EXAMPLE I

Polymerization of butadiene

Butadiene was bubbled slowly during a period of 5 hours into a solution of aqueous boron fluoride containing 1.25 mols of water to each mol of boron fluoride during which time the temperature of the reaction mixture was maintained at 25–35° C. The product was separated from the catalyst, dissolved in a mixture of toluene and ether, washed with water and dilute sodium bicarbonate solution, dried with magnesium sulfate and finally filtered. Removal of the solvent in vacuo left 10 parts of a soft amber colored resinous material. A thin film of this resin became tack-free when exposed to the atmosphere at room temperature for 3.5 hours.

EXAMPLE II

Interpolymerization of butadiene and propylene

A 21 x 0.75 inch glass tube sealed at one end and fitted with a sealed-in overflow tube near the top and a bubbling tube which reached to the bottom was immersed in a water-bath. The tube was then filled about half full of 6 mm. glass beads, and 131 grams of $BF_3(H_2O)_{1.25}$ was added. The overflow tube was connected to a gas trap and a mixture of approximately equal volumes of propylene and butadiene was added through the bubbling tube at a rate of 150 to 200 bubbles per minute while the temperature of the water bath was maintained at 25 to 28° C. The addition of olefin was discontinued after 26 hours. A high viscosity brown oil collected in the tube and about 1 liter of gas collected in the trap. The aqueous catalyst solution was decanted, the oil dissolved in ether, the ether solution cooled, and then washed with an excess of 5% aqueous sodium hydroxide solution. After drying, the ether was removed in vacuo whereupon 75 parts of a high viscosity, clear brown oil was obtained. A 50% toluene solution of the oil containing 0.03% cobalt drier gave a film which was tack-free but soft when air dried 2.5 hours. After being baked at 100° C., for four hours, the film was soft but tack-free at 100° C., and amber colored. At room temperature it was hard and brittle.

EXAMPLE III

Polymerization of butylene, isobutylene and butadiene

A commercial mixture of gaseous butylene, isobutylene and butadiene containing 25% of butadiene was enriched with one-half its volume of pure butadiene gas. This hydrocarbon mixture was polymerized by the method of Example II, except that $BF_3(H_2O)_{1.4}$ was used as the catalyst. During the course of 90 hours, 157 grams of a light brown clear oil was formed. The viscosity of the oil at 25° C. was 12.8 poises and the iodine number was 186. When baked for 1.75 hours at 100° C., in the presence of 0.03% cobalt drier, this oil gave films which were hard but brittle. Similarly, when exposed to the air at room temperature it became tack-free in 22 hours. The oil was compatible with a large number of natural and synthetic oils and resins including China-wood oil, rosin, ester gum, Amberol, certain oil modified alkyd resins, cumar, damar, dihydronaphthalene polymer, and cyclohexanone-formaldehyde resin. Air dried or baked films of the oil were resistant to alkalis but affected by acids and organic solvents such as toluene. A composition made by heating equal volumes of this oil with China-wood oil at 230° C. for 15 min. gave tough and flexible films when air dried for 3.5 hours in the presence of 0.03% cobalt drier.

EXAMPLE IV

*Interpolymerization of n-octene-1 and butadiene*

A solution of 21.6 parts of butadiene in 43 parts of n-octene-1 was slowly added, from a chilled dropping funnel, with mechanical stirring, to 45 parts of $BF_3(H_2O)_{1.4}$ at 16 to 25° C. A brown emulsion was formed. It was allowed to stand overnight and the oil layer which separated was removed from the aqueous $BF_3$ layer. The oil was dissolved in ether and extracted with an excess of 2% sodium hydroxide solution. The ether solution was dried and the solvent was evaporated in vacuo. Sixty-one parts of a residual pale yellow oil useful as a lubricant were obtained.

EXAMPLE V

*Interpolymerization of butadiene with isomeric olefins boiling at 60 to 80° C.*

A solution of 45 parts of butadient in 49 parts of isomeric olefins boiling at 60 to 80° C., was polymerized by the same method as described in Example IV except 75 parts of the catalyst solution was used. A light amber colored oil of medium viscosity was obtained. The yield was 90 parts which represents 96% of the combined weights of both reactants. When baked for 3 days at 100° C., in the presence of 0.03% cobalt drier, a tack-free, soft, brittle film was obtained.

EXAMPLE VI

*Interpolymerizaiton of commercial butylene and 2-chlorobutadiene-1,3*

A solution of 44 parts of commercial butylene containing 25% butadiene in 69 parts of 1-chlorobutadiene-1,3 was polymerized by the same method as described in Example IV using 75 parts of the catalyst solution. Seventy-seven parts of a dark brown oil of high viscosity were obtained. In the presence of 0.03% cobalt drier at 100° C., thin layers of it set up to dark brown, fairly hard, brittle films in 48 hours.

The procedure for bringing the reactant hydrocarbons in contact with the catalyst to effect the polymerization is subject to wide variations and depends somewhat upon the physical state of the hydrocarbon, i. e. gaseous or liquid. An effective method such as mixing or emulsifying the hydrocarbons and the catalyst at normal or superatmospheric pressure or spraying the catalyst into the gaseous hydrocarbons may be used without departing from the scope of the invention.

Any hydrocarbon or halogenated hydrocarbon having but one ethylene type double bond, including ethylene, butene-1, butene-2, isobutylene, cyclohexene, pentene-1, pentene-2, n-hexene-3, hexadecene-1, allyl chloride and 1,4-dichlorobutene-2, may be used. Any hydrocarbon or halogenated hydrocarbon having two and only two ethylene type double bonds including pentadiene, isoprene, dipentene and vinylcyclohexene may be used. The above olefinic compounds may be polymerized in the pure state or when mixed with one or more of the others. Olefinic hydrocarbons which are diluted with inert gases or liquids such as saturated hydrocarbons which occur in cracked petroleum gases or distillates may also be used. If desired the reaction may be carried out in the presence of aromatic hydrocarbons such as benzene, toluene or xylene. A solution of hydrofluoboric acid ($H_3BO_2F_2$) in an equal weight of concentrated sulfuric acid has also been found to be suitable for these polymerizations. The optimum composition for the aqueous boron fluoride catalyst ranges between the monohydrate and the dihydrate. A temperature of 25 to 35° C., is the more suitable temperature and the maximum temperature is preferably not more than about 50° C., when the preferred catalyst is used. When the catalyst is composed of more than two mols of water per mol of boron fluoride a higher reaction temperature such as 75° C., is desirable.

The catalyst generally separates from the oily polymerization products as a lower layer which can be removed and re-used. However, when the oil is of high viscosity, it is sometimes necessary to separate the catalyst by extraction with water. In either case the last trace of catalyst is removed from the product by extraction with dilute alkali or dilute sodium bicarbonate solution.

The nature of the product depends upon the ingredients used in the preparation thereof. Polymers made from mono-olefin-diolefin mixtures containing about 50% (by weight) or more of diolefins are highly unsaturated and are useful as drying oil substitutes. Polymers made from mono-olefins mixed with a relatively low proportion of diolefin are useful lubricating oils. The pure diolefins give highly unsaturated drying oils or rubber-like solids.

This invention is highly useful for the polymerization of diolefins and mixtures thereof with mono-olefins. The utility of the invention is shown by the fact that it affords a method for converting readily available olefinic hydrocarbons into either lubricating oils, drying oils or in some cases, resins.

Drying oils and resins produced in accordance with this invention may be used as such or as modifying agents for other drying oils or resins in the production of paints and varnishes. The unmodified polymers give film coats with good alkali resistance. Blends of the highly unsaturated oils produced in accordance with this invention with vegetable oils, e. g., China-wood oil in 1:1 ratios are useful as bases for the preparation of paints and varnishes.

The less highly unsaturated oils produced in accordance with this invention may be used either as lubricating oils or in admixture with petroleum oils to improve the oiliness and viscosity index.

The process of the present invention is highly advantageous because it involves the use of an aqueous solution of the catalyst. The catalyst is easily removed from the product and it can be used over and over again thus lending to economy of operation of the process. Hitherto anhydrous metallic halide catalysts have been used and it was necessary to free the reaction products from the catalyst by a laborious process in which the catalyst is destroyed. The invention holds the novel advantage in that the products thereof are usually oils whereas the products of the prior art are usually resinous solids.

The term "diolefin" as used in the specification and claims is used to signify a hydrocarbon or halogenated hydrocarbon having two and only two double linkages, i. e., linkages of the ethylene type. Similarly the term "mono-olefin" is used to signify a hydrocarbon or halogenated hydrocarbon having but one ethylenic type double linkage.

The above description and examples are intended to be illustrative only. Any modification of or variation therefrom which conforms to the spirit of the invention is intended to be included within the scope of the claims.

I claim:

1. The process of polymerizing butadiene which comprises bringing the same in contact with a solution of one mol of boron fluoride in 1.25 mols of water at 25 to 35° C.

2. Process of polymerizing a mixture of butadiene and propylene which comprises bringing said mixture into contact at 25 to 35° C. with a solution of one mol of boron trifluoride in 1.25 mols of water.

3. Process of polymerizing a mixture of a di-olefin and a mono-olefin which comprises bringing said mixture into contact at 25 to 35° C. with a solution of one mol of boron trifluoride in 1 to 2 mols of water.

4. Process of polymerizing a mixture of a di-olefin and a mono-olefin which comprises bringing said mixture into contact at 0–50° C. with a solution of one mol of boron trifluoride in from one to two mols of water.

5. Process of polymerizing which comprises bringing a diolefin into contact at 0–50° C. with a solution of one mol of boron trifluoride in from one to two mols of water.

JESSE HARMON.